United States Patent
Gretz

(10) Patent No.: US 7,525,043 B1
(45) Date of Patent: Apr. 28, 2009

(54) TWO-GANG RECESSED DUAL VOLTAGE ELECTRICAL BOX

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 12/151,184

(22) Filed: May 5, 2008

Related U.S. Application Data

(63) Continuation-in-part of application No. 11/903,721, filed on Sep. 24, 2007, now Pat. No. 7,485,805, which is a continuation-in-part of application No. 11/655,299, filed on Jan. 19, 2007, now Pat. No. 7,294,781, which is a continuation-in-part of application No. 11/356,590, filed on Feb. 16, 2006, now Pat. No. 7,166,801, which is a continuation-in-part of application No. 11/264,857, filed on Nov. 2, 2005, now Pat. No. 7,045,713, which is a continuation-in-part of application No. 11/246,985, filed on Oct. 7, 2005, now Pat. No. 7,064,271, which is a continuation-in-part of application No. 11/185,256, filed on Jul. 20, 2005, now Pat. No. 7,115,820, which is a continuation-in-part of application No. 11/102,392, filed on Apr. 8, 2005, now Pat. No. 7,151,219, which is a continuation-in-part of application No. 11/070,344, filed on Mar. 2, 2005, now Pat. No. 6,965,078, which is a continuation-in-part of application No. 11/009,116, filed on Dec. 10, 2004, now Pat. No. 7,005,578, which is a continuation-in-part of application No. 10/863,942, filed on Jun. 9, 2004, now Pat. No. 6,956,171.

(51) Int. Cl.
  *H02G 3/08* (2006.01)

(52) U.S. Cl. .......................... 174/50; 174/53; 174/480; 174/64; 174/58; 220/3.2; 248/906; 439/535

(58) Field of Classification Search .................. 174/50, 174/53, 57, 58, 63, 64, 135; 248/906, 343; 439/535; 220/4.02, 3.2, 3.3, 3.8, 3.7, 3.6
  See application file for complete search history.

(56) References Cited

U.S. PATENT DOCUMENTS

| | | | | |
|---|---|---|---|---|
| 1,961,728 | A * | 6/1934 | Arnest et al. | 220/3.92 |
| 4,059,327 | A | 11/1977 | Vann | |
| 4,936,794 | A | 6/1990 | Shaw et al. | |
| 5,486,650 | A | 1/1996 | Yetter | |
| 6,414,241 | B1 | 7/2002 | O'Donnell | |
| 6,737,576 | B1 * | 5/2004 | Dinh | 174/50 |
| 7,044,318 | B2 | 5/2006 | Gates, II | |

* cited by examiner

*Primary Examiner*—Dhiru R Patel

(57) ABSTRACT

A two-gang recessed electrical box assembly for recessing a high voltage component and a low voltage component within a wall. The recessed electrical box assembly includes a frame member including a lateral flange, a rearward extending collar, and a peripheral flange extending inward at the rear edge of the collar. A high voltage compartment and a low voltage compartment are provided at the rear of the frame member. The high voltage compartment includes an electrical box extending rearward from the peripheral flange and the low voltage compartment includes bosses extending inward from the peripheral flange. The electrical box assembly enables the recessed mounting of a high and low voltage component in a single electrical box.

19 Claims, 9 Drawing Sheets

TWO-GANG RECESSED DUAL VOLTAGE ELECTRICAL BOX

This application is a Continuation-In-Part of U.S. patent application Ser. No. 11/903,721 filed Sep. 24, 2007 and now U.S. Pat. No. 7,485,805, which is a Continuation-In-Part of U.S. patent application Ser. No. 11/655,299 filed Jan. 19, 2007 and now U.S. Pat. No. 7,294,781, which is a Continuation-In-Part of U.S. patent application Ser. No. 11/356,590 filed Feb. 16, 2006 and now U.S. Pat. No. 7,166,801, which is a Continuation-In-Part of U.S. patent application Ser. No. 11/264,857, filed Nov. 2, 2005 and now U.S. Pat. No. 7,045,713, which is a Continuation-In-Part of U.S. patent application Ser. No. 11/246,985, filed Oct. 7, 2005 and now U.S. Pat. No. 7,064,271, which is a Continuation-In-Part of U.S. patent application Ser. No. 11/185,256, filed Jul. 20, 2005 and now U.S. Pat. No. 7,115,820, which is a Continuation-In-Part of U.S. patent application Ser. No. 11/102,392, filed Apr. 8, 2005 and now U.S. Pat. No. 7,151,219, which is a Continuation-In-Part of U.S. patent application Ser. No. 11/070,344, filed Mar. 2, 2005 and now U.S. Pat. No. 6,965,078, which is a Continuation-In-Part of U.S. patent application Ser. No. 11/009,116 filed Dec. 10, 2004 and now U.S. Pat. No. 7,005,578, which is a Continuation-In-Part of U.S. patent application Ser. No. 10/863,942 filed Jun. 9, 2004 and now U.S. Pat. No. 6,956,171, all of which are commonly owned by the assignee of the present invention and the entire contents of which are incorporated herein by reference.

FIELD OF THE INVENTION

This invention relates to assemblies for the mounting of electrical devices and specifically to a recessed dual voltage electrical box that will accommodate a high voltage component and a low voltage component.

BACKGROUND OF THE INVENTION

U.S. patent application Ser. No. 11/903,721 filed Sep. 24, 2007 disclosed a two-gang recessed electrical box assembly that included a large electrical box and an optional voltage separator or panel. The electrical box assembly was capable of supporting either two high voltage components or two low voltage components ganged together side by side, or, with insertion of the voltage separator, a high voltage component and a low voltage component side by side.

Although the recessed electrical box of the type described in the aforementioned disclosure provided an adequate means for recessing two electrical components of either the high or low voltage type substantially within the wall of a structure, the electrical box required the use of a separator plate or panel when installing a high and low voltage component.

Accordingly, there is a need for a two-gang recessed electrical box assembly that is capable of accommodating both a high and low voltage component side by side without the use of a separator panel.

SUMMARY OF THE INVENTION

The invention is a two-gang recessed electrical box assembly for recessing a high voltage component and a low voltage component within a wall. The recessed electrical box assembly includes a frame member including a lateral flange, a rearward extending collar, and a peripheral flange extending inward at the rear edge of the collar. A high voltage compartment and a low voltage compartment are provided at the rear of the frame member. The high voltage compartment includes an electrical box extending rearward from the peripheral flange and the low voltage compartment includes bosses extending inward from the peripheral flange. The electrical box assembly enables the recessed mounting of a high and low voltage component in a single electrical box.

OBJECTS AND ADVANTAGES

A first object of the two-gang recessed electrical box assembly of the present invention is to provide a recessed electrical box that can accommodate a high and low voltage electrical component within the same assembly.

A second object of the two-gang recessed electrical box assembly of the present invention is to provide an electrical box assembly that positions the low and high voltage components behind the wall surface, thereby recessing the electrical devices and enabling close positioning of cabinets, wall clocks, appliances, and the like to the wall without interference or obstruction from the electrical components or any plug ends of cords connected to the electrical components.

A third object is to provide a two-gang recessed electrical box assembly that shields all of the installed electrical devices and any electrical cords plugged therein from splashing water, grease, impacts from vacuum cleaners, or other household hazards.

A further object is to provide a recessed electrical box assembly that provides a recessed area or cavity within the wall to hold the plug ends of electrical cords while they are in use, thereby recessing the plug ends away from the wall and from interference with any appliance or device they are connected to.

Another object of the present invention is to provide a two-piece recessed electrical box assembly that includes rotatable flags for securing the box within the wall.

Another object of the present invention is to make adjustment of the rotatable flags accessible from the front of the electrical box assembly.

These and other objects and advantages of the present invention will be better understood by reading the following description along with reference to the drawings.

DESCRIPTION OF THE DRAWINGS

FIG. 14 is a detail view of a flag portion of a mounting arrangement for securing the frame member to a wall.

TABLE OF NOMENCLATURE

Figure 1:
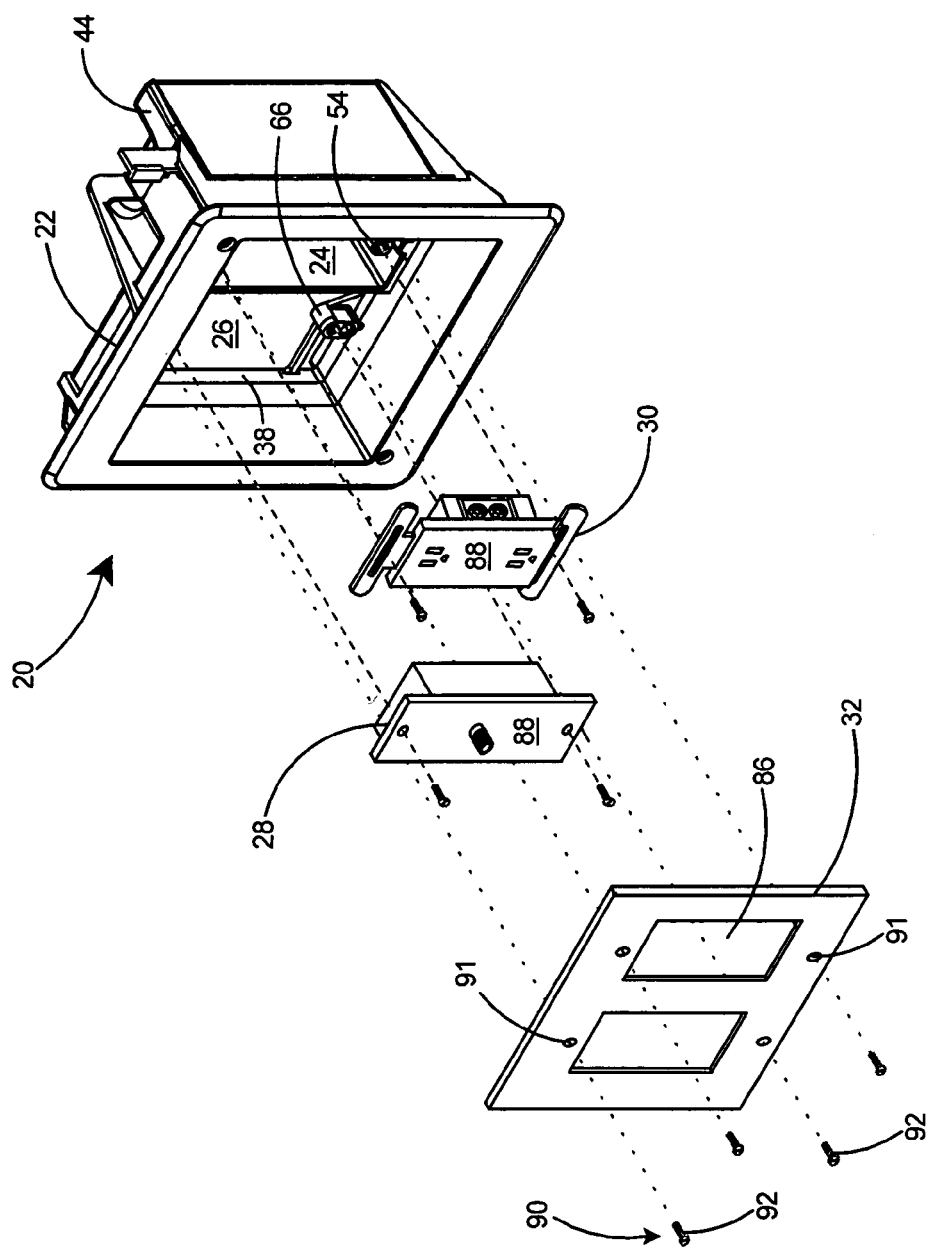
FIG. 1 is an exploded perspective view of a preferred embodiment of a two-gang recessed dual voltage electrical box assembly according to the present invention along with a low voltage and high voltage component and a complementary faceplate.

The following is a listing of part numbers used in the drawings along with a brief description:

| Part Number | Description |
| --- | --- |
| 20 | two-gang recessed electrical box |
| 22 | frame member |
| 24 | high voltage compartment |
| 26 | low voltage compartment |
| 28 | low voltage component |
| 30 | high voltage component |
| 32 | faceplate |
| 34 | lateral flange |
| 36 | rearward extending collar |
| 38 | peripheral flange |
| 40 | rear edge of collar |
| 42 | front opening |
| 44 | electrical box |
| 46 | vertical sidewall |
| 48 | horizontal sidewall |
| 50 | front opening of electrical box |
| 52 | inner edge of peripheral flange |
| 54 | boss of electrical box |
| 56 | bore |
| 58 | recessed area |
| 60 | flat wall portion |
| 62 | knockout wall portion |
| 64 | back wall of electrical box |
| 66 | boss of low voltage compartment |
| 68 | bore |
| 70 | front abutting surface of low voltage boss |
| 72 | opening of low voltage compartment |
| 74 | channel |
| 76 | front abutting surface of high voltage boss |
| 78 | vertical portion of collar |
| 80 | horizontal portion of collar |
| 82 | outer surface of collar |
| 84 | rib |
| 86 | opening in faceplate |
| 88 | face portion of electrical component |
| 90 | fastening arrangement |
| 91 | aperture in faceplate |
| 92 | fastener |
| 94 | horizontal reinforcing strut |
| 96 | mounting arrangement |
| 98 | mounting fastener |
| 102 | flag |
| 104 | first end of flag |
| 106 | second end of flag |
| 108 | bore in flag |
| 110 | planar face of flag |
| 112 | wall insertion position of flag |
| 114 | tightening position of flag |
| 116 | outer corner of electrical box |
| 118 | wing |
| 120 | hole |
| 122 | drywall |
| 124 | wall |
| 126 | duplex receptacle |
| 128 | fastener |

-continued

| Part Number | Description |
| --- | --- |
| 130 | push-in electrical connector |
| 132 | recessed cavity |
| 134 | plug end of electrical cord |
| D1 | width of collar and peripheral flange |
| $\theta_1$ | angle of peripheral flange with respect to rear edge of collar |

DETAILED DESCRIPTION OF THE INVENTION

With reference to FIG. 1, there is shown a preferred embodiment of the present invention, which is a two-gang recessed electrical box assembly 20 including a frame member 22 having a high voltage compartment 24 and a low voltage compartment 26. Exploded away from the electrical box assembly 20 are a low voltage component 28, a high voltage component 30, and a faceplate 32 for closing the area around the electrical components 28 and 30 after they have been secured therein within the assembly 20.

Figure 2:
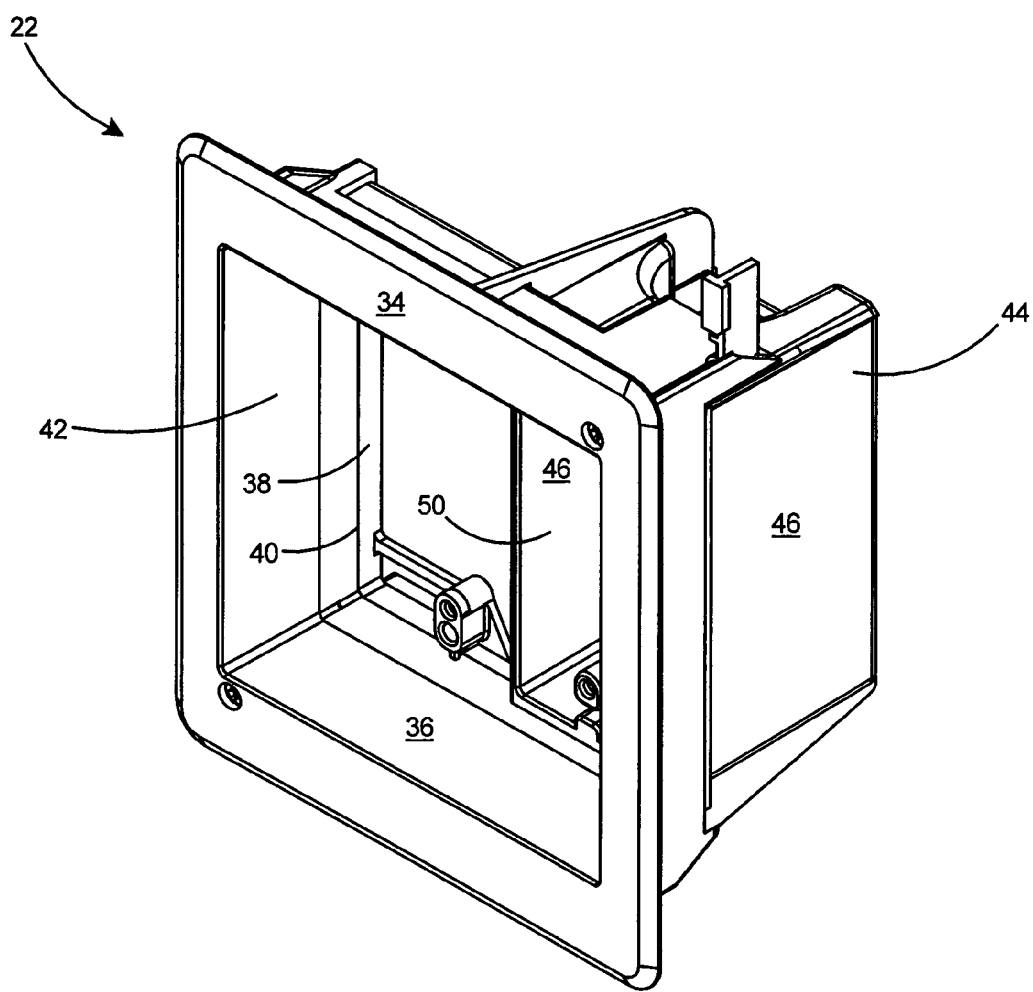
FIG. 2 is a perspective view of the frame member portion of the two-gang recessed electrical box assembly of FIG. 1.

Referring to FIG. 2, the frame member 22 of the electrical box assembly includes a lateral flange 34, a rearward extending collar 36, a peripheral flange 38 extending inward from the rear edge 40 of the collar 36, and a front opening 42. The high voltage compartment 24 includes an electrical box 44 having two pairs of opposing sidewalls including vertical sidewalls 46 and horizontal sidewalls 48, and a front opening 50.

Figure 3:
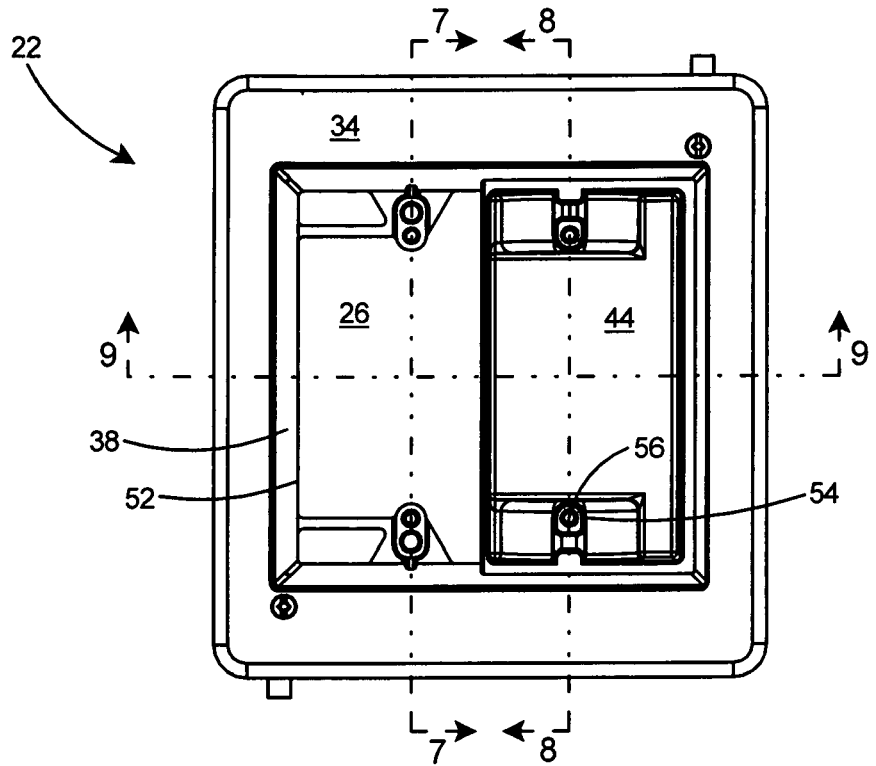
FIG. 3 is a front view of the frame member of FIG. 2.
Figure 4:
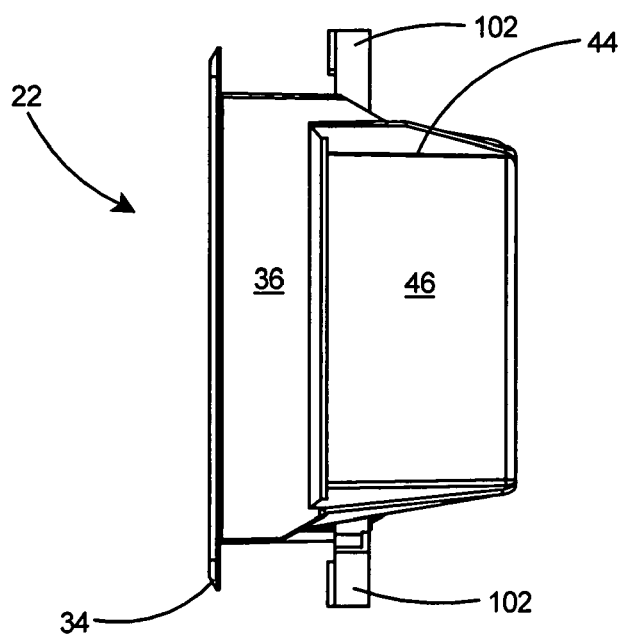
FIG. 4 is a side view of the frame member as viewed from the right side of FIG. 3.

As shown in FIG. 3, the electrical box 44 and the low voltage compartment 26 are located side by side at the inner edge 52 of the peripheral flange 38. The electrical box 44 includes bosses 54 extending from the peripheral flange 38. The bosses 54 include bores 56 for accepting fasteners (not shown) from a high voltage component.

Figure 5:
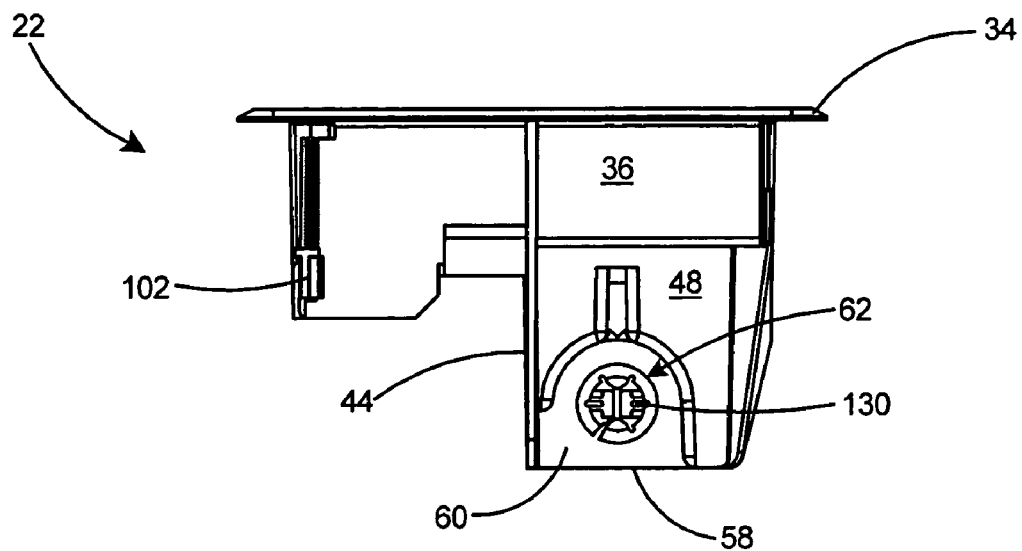
FIG. 5 is a bottom view of the frame member as viewed from the bottom of FIG. 3.

Referring to FIG. 5, depicting a bottom view of the two-gang recessed electrical box assembly 20, a recessed area 58 is provided in each of the horizontal sidewalls 48 of the electrical box 44. The recessed area 58 includes a flat wall portion 60 that covers a substantial portion of each of the horizontal sidewalls 48. The flat wall portion 60 includes a knockout wall portion 62 that may be removed from the flat wall portion 60 when desired to create an opening therein in the recessed area 58. The opening including the surrounding flat wall area 60 is adapted for flush engagement of an electrical fitting (not shown) inserted therein.

Figure 6:
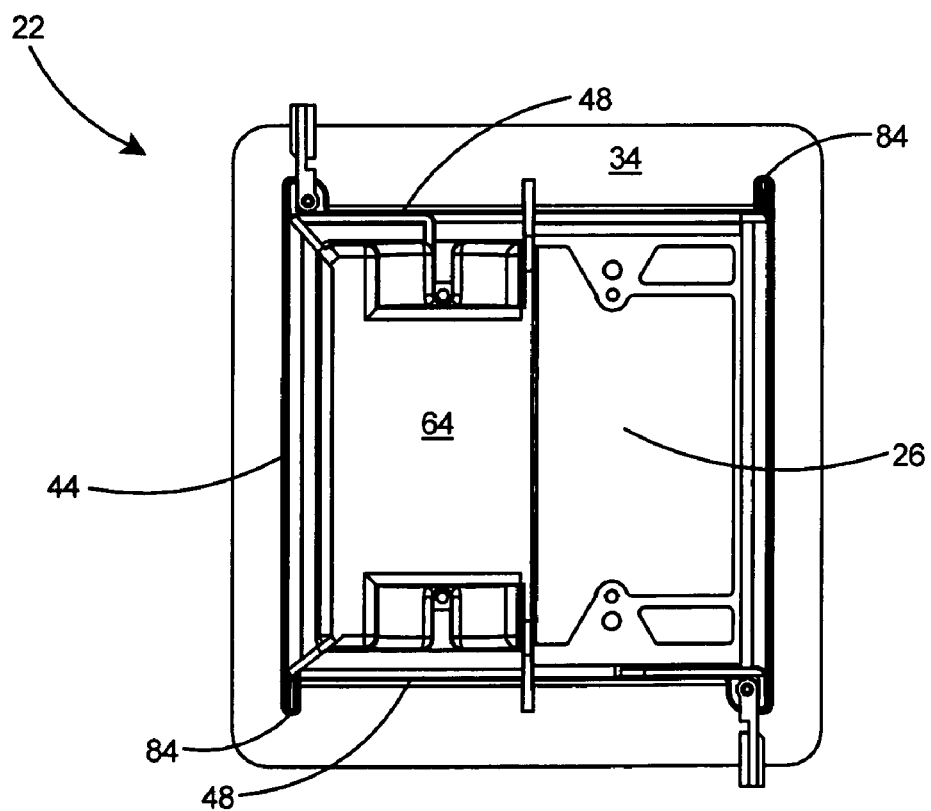
FIG. 6 is a rear view of the frame member of FIG. 2.

As shown in FIG. 6 depicting a back view of the two-gang recessed electrical box assembly 20, the electrical box 44 includes a back wall 64. The recessed areas 58 extend a substantial distance into the electrical box 44 from each of the two horizontal sidewalls 48.

Figure 7:
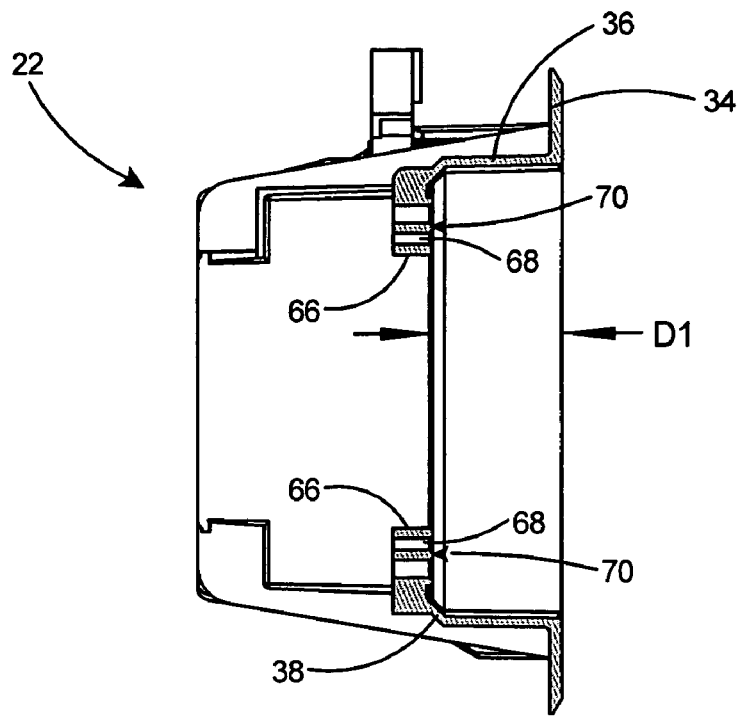
FIG. 7 is a sectional view of the frame member taken along line 7-7 of FIG. 3.

With reference to FIG. 7, the low voltage compartment 26 includes a boss 66 extending from the top and bottom of the peripheral flange 38. The bosses 66 in the low voltage compartment 26 include bores 68 therein for securing a low voltage electrical component (not shown) therein. The bosses 66 in the low voltage compartment 26 include a front abutting surface 70. The front abutting surfaces 70 of the bosses 66 are recessed from the lateral flange 34 by the width D1 of the collar 36 and the peripheral flange 38. The bosses of the low voltage compartment 26 include a top and bottom bosses 66 and a low voltage compartment opening 72 extending between the top boss 66 and bottom boss 66.

Figure 8:
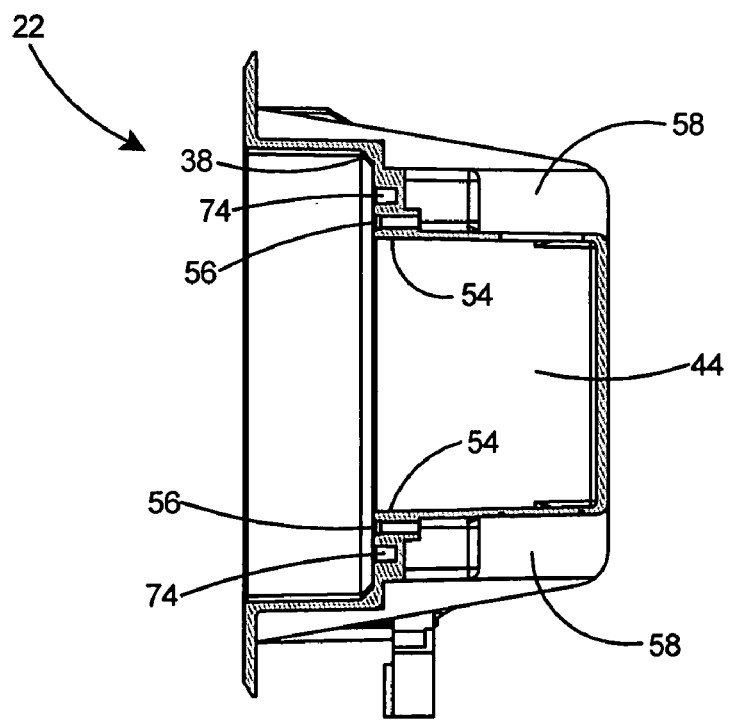
FIG. 8 is a sectional view of the frame member taken along line 8-8 of FIG. 3.

Referring to FIG. 8, the bosses 54 of the electrical box 44 extend along the vertical sidewalls 46 from the recessed area 58 to the peripheral flange 38 of the frame member 22. The electrical box bosses 54 include a channel 74 therein immediately outward of the bores 56. The channels 74 will function to provide clearance for the ends of faceplate mounting fasteners (not shown) when the faceplate is mounted to the frame member 22. The bosses 54 in the electrical box 44 include a front abutting surface 76. The front abutting surface 76 of the bosses 54 are recessed from the lateral flange 34 by the width D1 of the collar 36 and the peripheral flange 38. One of the vertical sidewalls 46 of the electrical box 44 provides a voltage separator wall between the electrical box 44 and the low voltage compartment 26.

Figure 9:
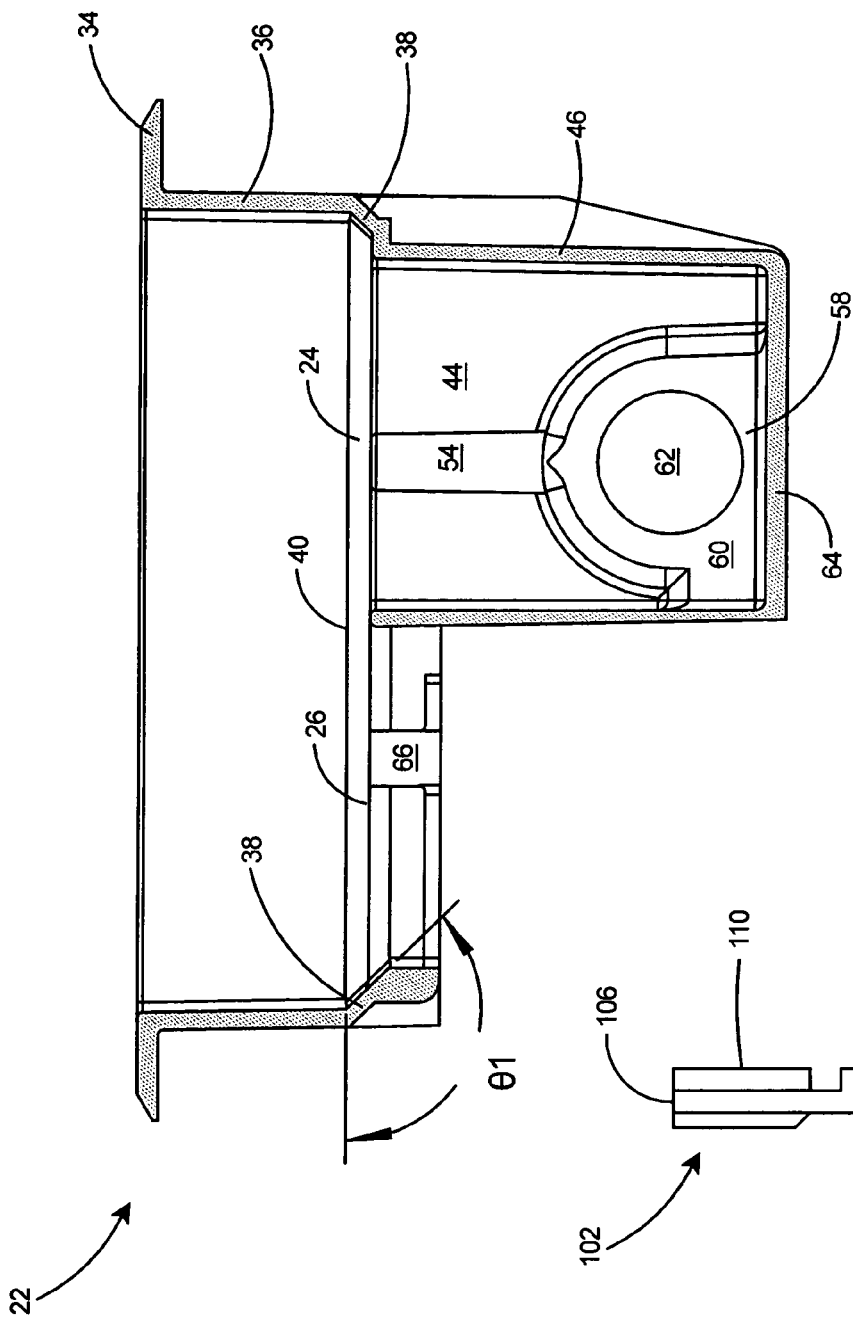
FIG. 9 is a sectional view of the frame member taken along line 9-9 of FIG. 3.

As shown in FIG. 9, the peripheral flange 38 is at an angle $\theta_1$ with respect to the rear edge 40 of collar 36. Angle $\theta_1$ is preferably between 125 and 145 degrees to enable the outer edge of the faceplate (not shown) when inserted into the frame member 22, to seat against the peripheral flange 38. Providing peripheral flange 38 at an angle $\Theta 1$ ensures that various faceplates will seat properly when mounted to frame member 22 regardless of small size differences the length and height of the faceplates.

Figure 10:
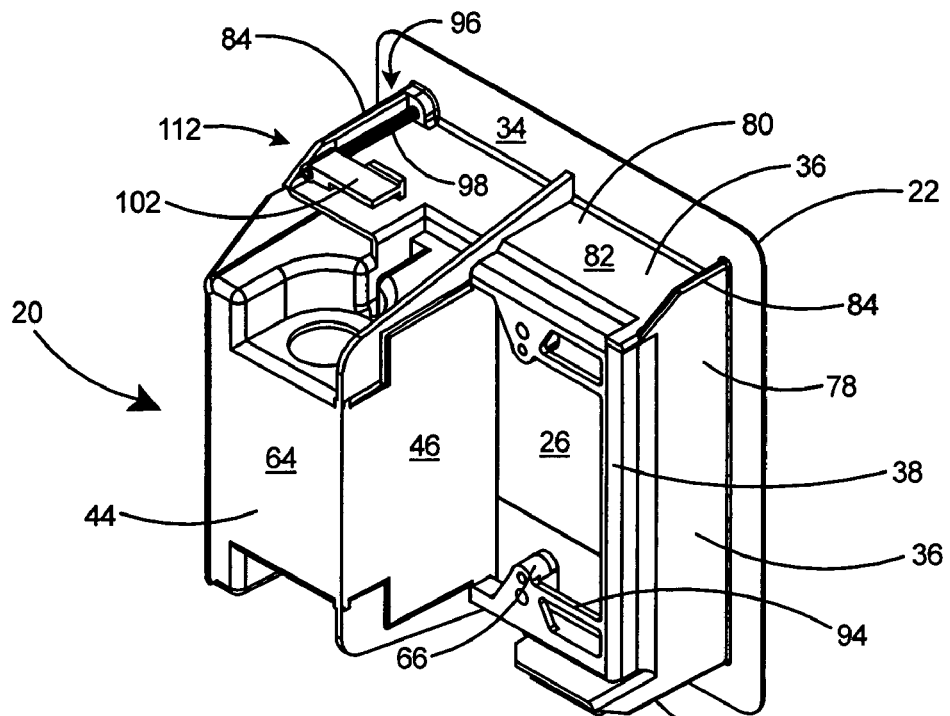
FIG. 10 is a rear perspective view of the two-gang recessed electrical box assembly depicting the flag rotated to its counterclockwise position.

With reference to FIG. 10, a rear perspective view of the recessed electrical box assembly 20, the collar 36 includes a vertical portion 78, a horizontal portion 80, and an outer surface 82. The collar 36 includes one or more ribs 84 extending outward from and longitudinally along the outer surface 82 of the horizontal portion 80.

Referring to FIG. 1, the faceplate 32 of the recessed electrical box assembly 20 includes one or more openings 86, the openings 86 adapted to accept the face portion 88 of an electrical component 28 and 30 therein, and a fastening arrangement 90 for securing the faceplate 32 to the frame member 22. The fastening arrangement 90 includes an aperture 91 in the faceplate 32 and a fastener 92 that is secured through the aperture 91 of the faceplate 32 into the bosses 54 and 66 in the peripheral flange 38. When attached thereto, the faceplate 32 is secured flush against the peripheral flange 38 of the frame member 22.

With reference to FIG. 10, the bosses 66 of the low voltage compartment 26 include horizontal reinforcing struts 94 extending from the boss 66 to the peripheral flange 38. The recessed electrical box assembly 20 further includes a mounting arrangement 96 for securing the electrical box 44 to a wall. The mounting arrangement 96 includes one or more threaded mounting fasteners 98 inserted through the lateral flange 34, a rib 84 extending from the collar 36 adjacent each of the mounting fasteners 98, and a flag 102 on the end of each of the mounting fasteners 98.

As shown in FIG. 14, the flags 102 include two ends 104 and 106, a bore 108 on one end 104, and a forward extending planar face 110 on a second end 106. With reference to FIG. 10, the mounting fasteners 98 extend through the flag 102. As depicted in FIG. 10, the mounting fasteners 98 may be rotated counterclockwise to a wall insertion position 112 in which the flags 102 are flush against the outer surface 82 of the collar 36.

Figure 11:
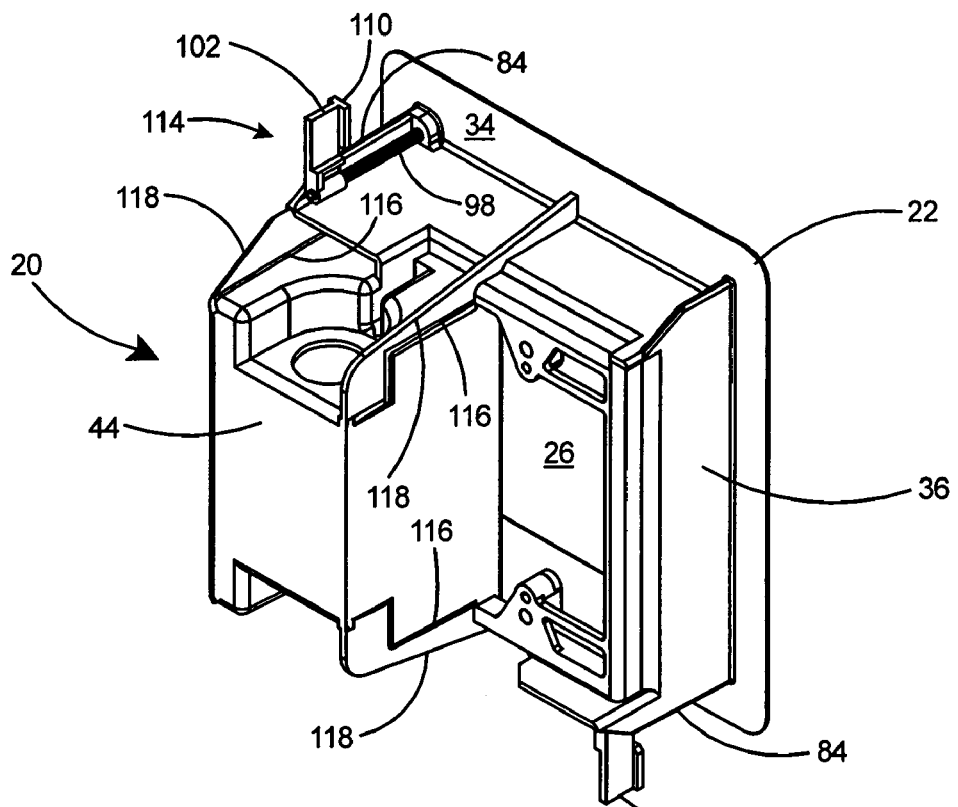
FIG. 11 is a rear perspective view of the two-gang recessed electrical box assembly depicting the flag rotated to its clockwise position.

Referring to FIG. 11, after the recessed electrical box assembly 20 is inserted into the wall (not shown), the flags 102 may be rotated clockwise to a tightening position 114 in which the flags 102 contact one of the ribs 84 and continued tightening of the mounting fasteners 98 advance the planar face 110 of the flag 102 toward the lateral flange 34. The electrical box 44 includes four outer corners 116 and each of the outer corners 116 include wings 118 extending outwardly there from. The wings 118 extend rearward and slope away from the lateral flange 34.

Figure 12:
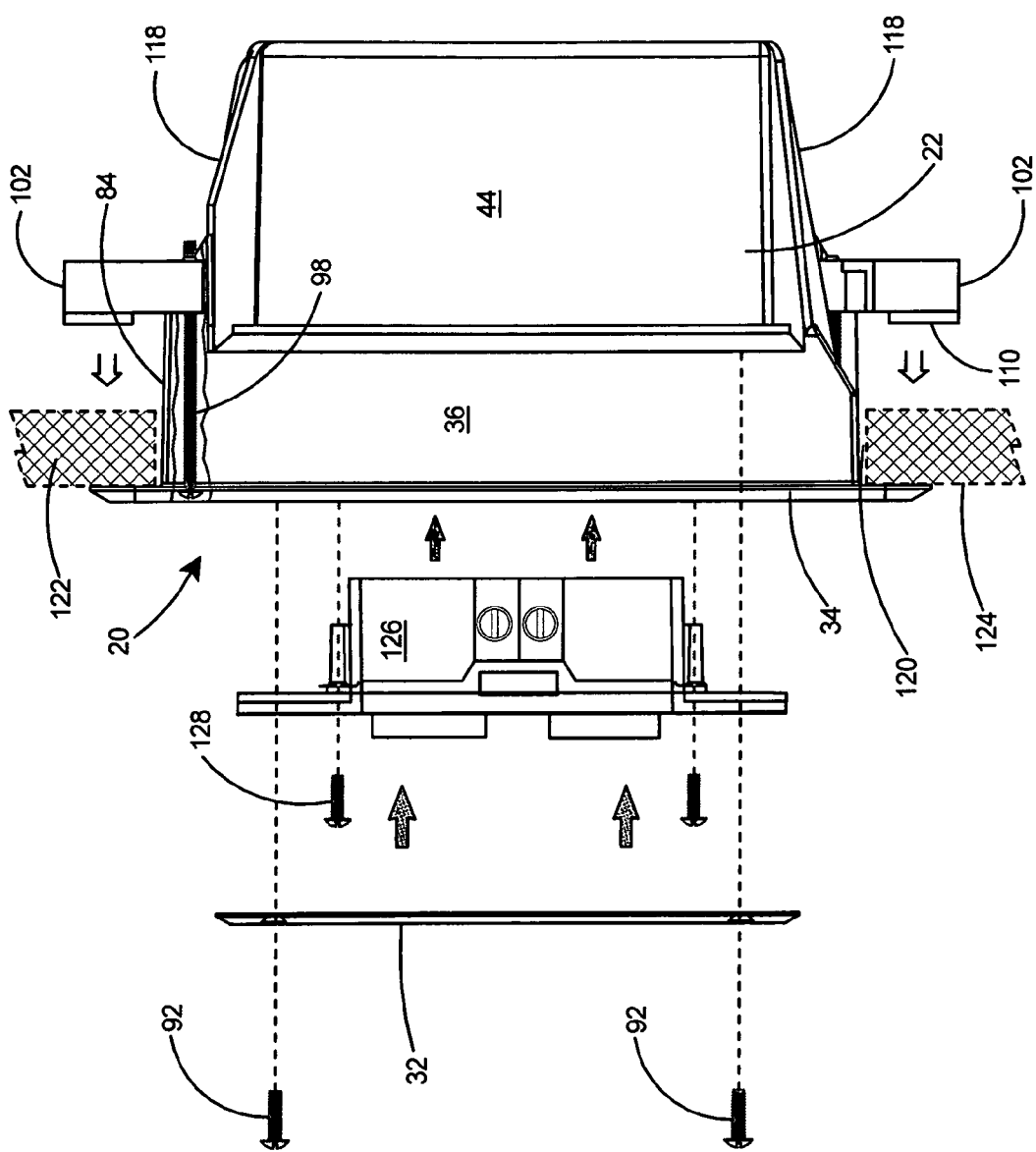
FIG. 12 is an exploded side view of the two-gang recessed dual voltage electrical box assembly of the present invention including a high voltage component and a complementary faceplate in alignment with the electrical box to be inserted therein.

With reference to FIG. 12, there is shown an illustration depicting the operation of a two-gang recessed electrical box assembly 20 according to the present invention. A hole 120 of the appropriate size is made in the drywall 122 that forms the wall 124 of a structure. The hole 120 is made large enough to accommodate the outer profile of the collar portion 36 of the frame member 22, including the ribs 84 with the flags 102 rotated counterclockwise or against the collar 36. The frame member 22 is then inserted until the lateral flange 34 is flush against the drywall 122. The wings 118, sloping away from the lateral flange 34 toward the rear, help guide the frame member into the hole 120. The mounting fasteners 98 are then turned clockwise until the flag 102 contacts rib 84 and continue to be turned until flag 102 draws tight against the drywall 122. After both flags 102 are tightened against drywall 122, the frame member 22 is fastened securely in the wall 124. After wiring connections are made, electrical components such as duplex receptacle 126 are secured within the frame member 22 with fasteners 128 and a low voltage component (not shown) is inserted into the low voltage compartment. To finish the installation, faceplate 32 is secured to the frame member 22 with fasteners 92.

Figure 13:
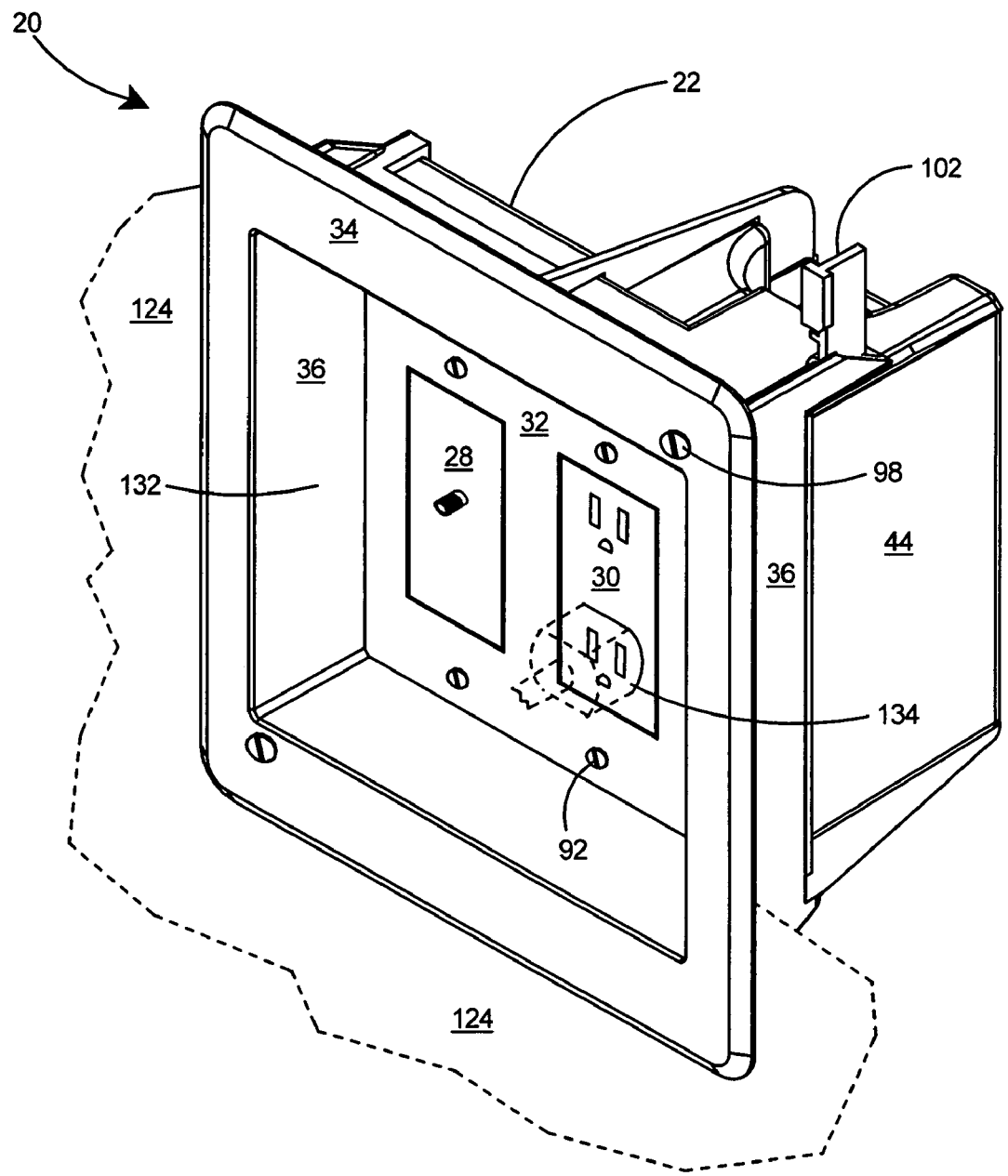
FIG. 13 is a perspective view of the two-gang recessed electrical box assembly including a high and low voltage component and a faceplate.

With reference to FIG. 13 there is shown is a perspective view of the two-gang recessed electrical box assembly 20 of FIG. 12 after being installed on a wall 124, a cutaway portion of which is shown. The recessed electrical box assembly 20 includes a high voltage component 30, a low voltage component 28, and a faceplate 32 installed therein. The recessed electrical box assembly 20 provides a spacious recessed cavity 132 that recesses the plug ends of electrical cords 134 or the terminal ends (not shown) of any low voltage components therein. Thus, any plug ends of cords carrying line current or terminal ends of cables are kept protected and out of the way.

The frame member 22 portion and faceplate 32 of the electrical box assembly of the present invention may each be constructed of metal or plastic. In an especially preferred embodiment, the frame member 22 and faceplate 32 are preferably each molded in one piece of plastic. The faceplate 32 may be a conventional duplex decora style plate.

As shown in FIG. 5, the recessed area 58 and flat wall portion 60 of electrical box 44 enables the use of electrical fittings of connectors such as the BLACK BUTTONB™ push-in connector 130 for connecting non-metallic cable to the electrical box 44. The BLACK BUTTONB™ push-in connector, available from Arlington Industries of Scranton, Pa., is simply pushed into one of the knockouts 62 provided in the recessed area 58. The recessed area 58 prevents the push-in connectors 130 from projecting outward from the sidewalls of the electrical box 44 and interfering with placement of the electrical box in locations where space is tightly restricted.

Having thus described the invention with reference to a preferred embodiment, it is to be understood that the invention is not so limited by the description herein but is defined as follows by the appended claims.

What is claimed is:

1. A two-gang recessed electrical box assembly comprising:
a one-piece frame member including a lateral flange, a rearward extending collar extending to a rear end, and a front opening;
a peripheral flange on said frame member extending inward at said rear end of said collar;
an electrical box integral with and extending rearward from said peripheral flange of said frame member, said electrical box including an open front, two pairs of opposing sidewalls, and a rear wall defining an electrical enclosure therein;
one of said opposing sidewalls and a vertical portion of said collar dividing said recessed electrical box assembly into a high voltage compartment and a low voltage compartment;
a mounting arrangement for securing said frame member to a wall;
said mounting arrangement including one or more threaded mounting fasteners inserted through said lateral flange and a flag secured to the end of each of said mounting fasteners; and said mounting arrangement securing said frame member to the wall whereby said lateral flange of said frame member is flush against the wall and the width of said rearward extending collar and said peripheral flange determining the distance said high voltage compartment and said low voltage compartment are recessed within the wall.

2. The two-gang recessed electrical box assembly of claim 1 wherein
said high voltage compartment and said low voltage compartment are located side by side at said peripheral flange; and
said frame member is molded in one piece of plastic.

3. The two-gang recessed electrical box assembly of claim 1 wherein said electrical box includes
bosses extending from said peripheral flange; and
said bosses of said electrical box include bores therein for securing a high voltage electrical component in said electrical enclosure.

4. The two-gang recessed electrical box assembly of claim 3 wherein
said bosses in said electrical box include a front abutting surface; and
said front abutting surface of said bosses are recessed from said lateral flange by said width of said collar and said peripheral flange.

5. The two-gang recessed electrical box assembly of claim 3 wherein
said pairs of opposing sidewalls of said electrical box include vertical sidewalls and horizontal sidewalls; and
a recessed area in each of said horizontal sidewalls;
said recessed area including a flat wall portion therein; and
said recessed area covers a substantial portion of each of said horizontal sidewalls.

6. The two-gang recessed electrical box assembly of claim 5 wherein
said flat wall portion includes a knockout wall portion therein; and
said knockout portion adapted to be removed from said flat wall portion creating an opening therein in said recessed area; and
said opening including a surrounding flat wall area adapted for flush engagement of an electrical fitting inserted therein.

7. The two-gang recessed electrical box assembly of claim 5 wherein
said bosses of said electrical box extend along said vertical sidewalls from said recessed area to said peripheral flange of said frame member; and
one of said vertical sidewalls of said electrical box provides a voltage separator wall between said electrical box and said low voltage compartment.

8. The two-gang recessed electrical box assembly of claim 5 wherein
said electrical box includes four outer corners; and
each of said outer corners of said electrical box includes wings extending outwardly there from.

9. The two-gang recessed electrical box assembly of claim 1 wherein said low voltage compartment includes
bosses extending from said peripheral flange; and
said bosses in said low voltage compartment include bores therein for securing a low voltage electrical component therein.

10. The two-gang recessed electrical box assembly of claim 9 wherein
said bosses in said low voltage compartment include a front abutting surface; and
said front abutting surface of said bosses are recessed from said lateral flange by said width of said collar.

11. The two-gang recessed electrical box assembly of claim 9 wherein said bosses of said low voltage compartment include horizontal reinforcing struts extending from said bosses to said peripheral flange.

12. The two-gang recessed electrical box assembly of claim 11 wherein
said bosses of said low voltage compartment include a top boss and a bottom boss; and
a low voltage compartment opening extending between said top boss and bottom boss.

13. The two-gang recessed electrical box assembly of claim 1 wherein
said collar includes an outer surface;
said collar includes a vertical portion and a horizontal portion; and
one or more ribs extending outward from and longitudinally along said outer surface of said horizontal portion of said collar.

14. The two-gang recessed electrical box assembly of claim 1 including
a faceplate having one or more openings therein, said openings in said faceplate adapted to accept the face portion of an electrical component therein; and
a fastening arrangement for securing said faceplate to said frame member.

15. The two-gang recessed electrical box assembly of claim 14 wherein said fastening arrangement includes
an aperture in said faceplate;
a boss extending from said peripheral flange, said boss including a bore therein; and
a fastener for securing through said aperture of said faceplate into said boss in said peripheral flange whereby said faceplate is secured flush against said peripheral flange of said frame member.

16. The two-gang recessed electrical box assembly of claim 15 wherein
said bosses of said electrical box extending from said peripheral flange include a channel therein outward of said bores;
said channels adapted to provide clearance for the ends of said fasteners for securing said faceplate to said frame member; and
said faceplate is molded in one piece of plastic.

17. The two-gang recessed electrical box assembly of claim 1 wherein said mounting arrangement includes
a rib extending from said collar adjacent each of said mounting fasteners.

18. The two-gang recessed electrical box assembly of claim 17 wherein
said flag including two ends, a bore on one end and a forward extending planar face on a second end; and
said mounting fastener extending through said bore of said flag.

19. The two-gang recessed electrical box assembly of claim 18 wherein said mounting fasteners may be
rotated counterclockwise to an insertion position in which said flag is flush against said outer surface of said collar; and
rotated clockwise to a tightening position in which said flag contacts one of said ribs and continued tightening of said mounting fasteners advance said planar face of said flag toward said lateral flange.

* * * * *